(12) United States Patent
Dekarske

(10) Patent No.: US 12,082,558 B2
(45) Date of Patent: Sep. 10, 2024

(54) DEVICE FOR PERMITTING A DOG WALKER TO SIMULTANEOUSLY WALK TWO DOGS

(71) Applicant: David Dekarske, Lancaster, SC (US)

(72) Inventor: David Dekarske, Lancaster, SC (US)

( * ) Notice: Subject to any disclaimer, the term of this patent is extended or adjusted under 35 U.S.C. 154(b) by 172 days.

(21) Appl. No.: 17/898,739

(22) Filed: Aug. 30, 2022

(65) Prior Publication Data

US 2024/0065230 A1 Feb. 29, 2024

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC .. A01K 27/005; A01K 27/003; Y10T 24/396; Y10T 24/3967
See application file for complete search history.

(56) References Cited

U.S. PATENT DOCUMENTS

| 5,462,019 A * | 10/1995 | Hong-Rong | A01K 1/04 D30/153 |
| 9,032,594 B1 * | 5/2015 | Mitchell | F16B 45/024 24/601.5 |
| 9,206,836 B2 * | 12/2015 | DeBien | F16B 45/02 |
| 10,058,075 B2 * | 8/2018 | Nakata | A01K 27/005 |
| 2017/0245470 A1 * | 8/2017 | Renforth | A01K 27/003 |

\* cited by examiner

*Primary Examiner* — Robert Sandy
(74) *Attorney, Agent, or Firm* — Jeffrey C. Watson, Esq.; Grell & Watson Patent, Attorneys LLC

(57) ABSTRACT

A dog leash splitting device to allow for the walking of two dogs simultaneously. The leash splitting device has a housing section. A handheld leash connection clip is connected to the housing section. A rotating shaft is rotatably connected to the housing section. A cord access hole extends through the rotating shaft. A dog connection cord extends through the cord access hole. A cord tightening screw extends through the rotating shaft and into the cord access hole. The dog connection cord is free to slide through the cord access hole when said tightening screw is loose. The dog connection cord is stopped from sliding through the cord access hole when the cord tightening screw is tightened onto the dog connection cord.

7 Claims, 8 Drawing Sheets

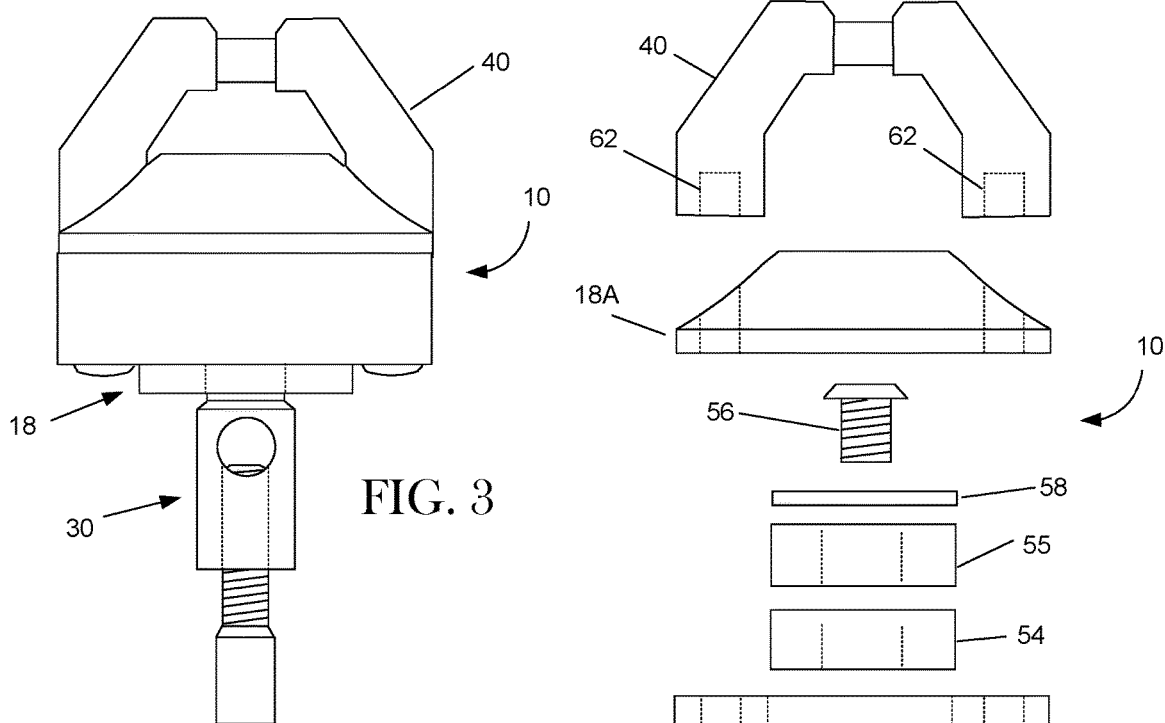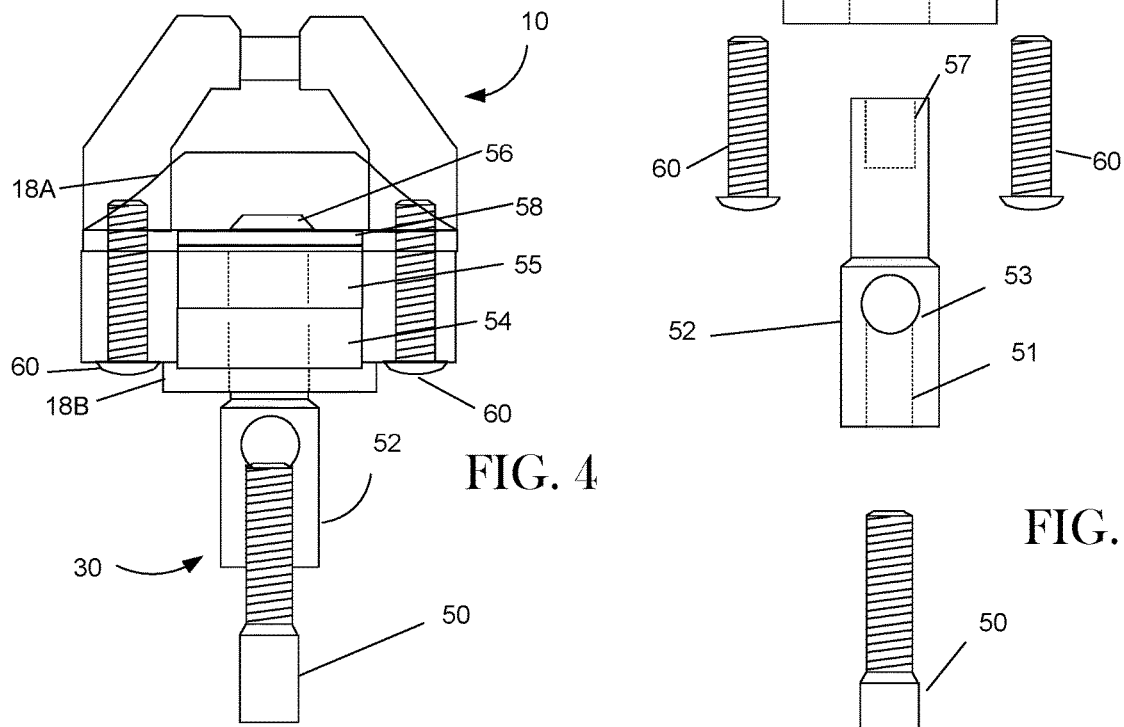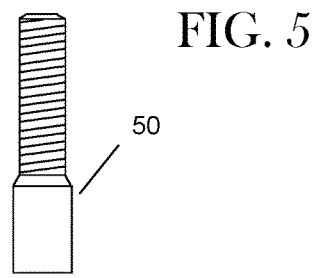

DEVICE FOR PERMITTING A DOG WALKER TO SIMULTANEOUSLY WALK TWO DOGS

The present invention relates to dog walking devices, and in particular, to dog walking devices that permit the walking of more than one dog.

BACKGROUND OF THE INVENTION

Domesticated dogs are found throughout the world. They offer companionship, protection and love for their families. Additionally, dogs can be trained to serve law enforcement, search and rescue organizations and the military. They work on farms and on ranches.

It is important that dog owners provide optimum care for their dogs. Dogs need to be properly fed, trained and exercised. Often it is very difficult to allow a dog to run free off-leash. It is very common for areas of society to require dogs to be on leashes while being walked. In many cases strict leash laws are enforced.

There are currently a variety of leashes available in the prior art available. Some of these leashes even proport to allow for the walking of multiple dogs. However, it is often a cumbersome and chaotic process to walk more than one dog at once. Prior art multiple dog leashes often become tangled and are difficult for the dog walker to operate.

What is needed is a better dog leash that allow for the walking of two dogs at once without tangling of the leash.

SUMMARY OF THE INVENTION

The present invention provides a dog leash splitting device to allow for the walking of two dogs simultaneously. The leash splitting device has a housing section. A handheld leash connection clip is connected to the housing section. A rotating shaft is rotatably connected to the housing section. A cord access hole extends through the rotating shaft. A dog connection cord extends through the cord access hole. A cord tightening screw extends through the rotating shaft and into the cord access hole. The dog connection cord is free to slide through the cord access hole when said tightening screw is loose. The dog connection cord is stopped from sliding through the cord access hole when the cord tightening screw is tightened onto the dog connection cord.

BRIEF DESCRIPTION OF THE DRAWINGS

FIGS. 3 and 4 show side views of a preferred leash splitter.

FIG. 5 shows an exploded view of a preferred leash splitter.

DETAILED DESCRIPTION OF THE PREFERRED EMBODIMENTS

Figure 1:
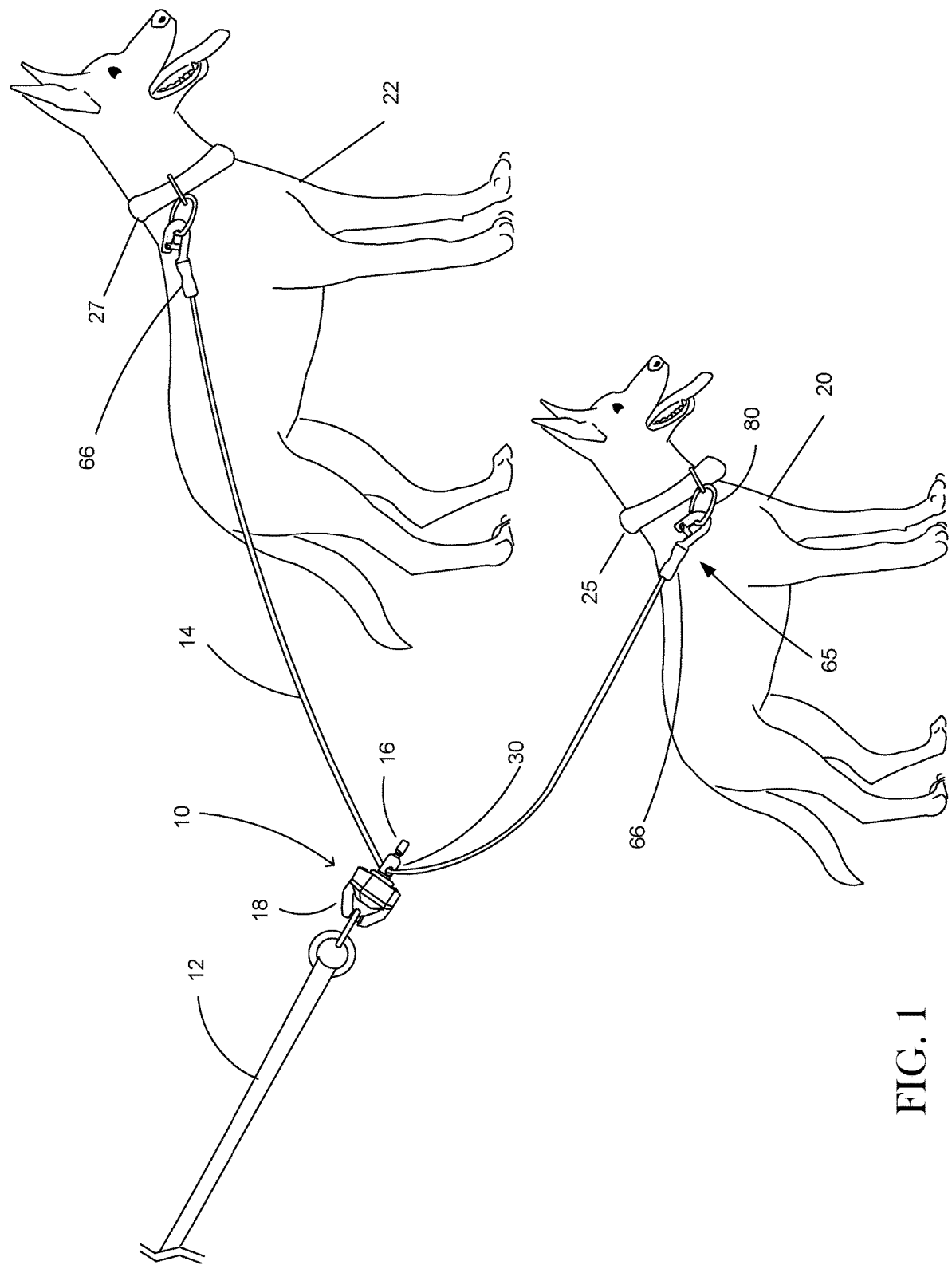
FIG. 1 shows a preferred embodiment of the present invention.

FIG. 1 shows the utilization of a preferred embodiment of the present invention. Leash splitter 10 is connected to hand held leash 12. Cord 14 is threaded through splitter bottom section 16. One end of cord 14 is connect to leash 25 of small dog 20. The other end of cord 14 is connected to leash 27 of larger dog 22. The user may allow cord 14 to slip freely through leash splitter 10 or the user may tighten screw 16 on cord 14 to freeze the motion of cord 14 through splitter 10. In this fashion, the user can control the length of cord 14 to each dog. For example, small dog 20 is younger and not yet completely trained and therefore should have a smaller leash. In contrast, larger dog 22 is well behaved with more training and older and is deserving of a longer leash. It should be noted that lower section 30 rotationally attached to housing section 18, thereby preventing tangling of cord 14 while the dogs are being walked. Once the dog owner is comfortable with both dogs, he can loosen screw 16, thereby giving each dog greater movement potential. Further explanation of the preferred features of splitter 10 and other features of the present invention is provided below.

Leash splitter 10 performs a variety of functions. Two of these are: (1) when unlocked, leash splitter 10 allows the cord 14 to pass freely through it, thereby making the shaft a fulcrum point to reduce the forces being applied to the user, and distribute them back to the tethered dogs; (2) when locked, leash splitter 10 splits cord 14 at various incremental lengths to allow the user to police the control of one dog more than the other if needed.

Figure 2:
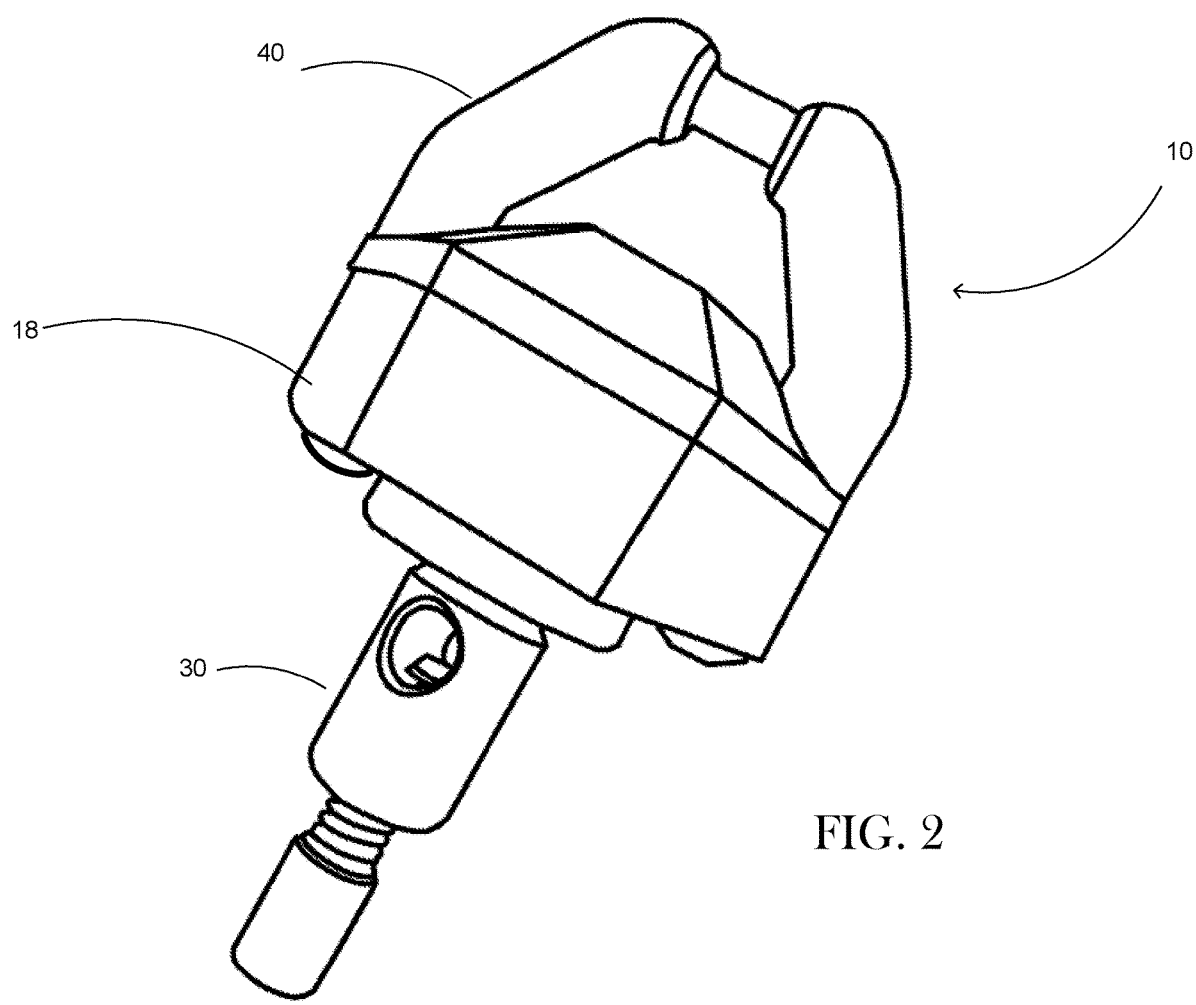
FIG. 2 shows a perspective view of the leash splitter.

FIG. 2 shows a perspective view and FIG. 3 shows a side view of leash splitter 10. As stated above, lower section 30 is pivotally attached to housing section 18. The pivotal attachment ensures that cord 14 will not become tangled during utilization of the present invention. Handheld leash attachment clip 40 is rigidly connected to housing structure 18, as shown.

FIG. 5 shows an exploded view of leash splitter 10 and FIG. 4 shows a see-through side view of leash splitter 10. Locking screw 50 is threaded onto threads 51 of rotating shaft 52. Hole 53 extends through rotating shaft 52, as shown. Locking screw 50 may be threaded into the space created by hole 53 so as to lock cord 14 into a set position as shown and described above in reference to FIG. 1.

Rotating shaft 52 is inserted through lower housing section 18B, radial bearing 54, and thrust bearing 55. Washer 58 is positioned between shaft screw 56 and thrust bearing 55. Shaft screw 56 is threaded onto threads 57 of rotating shaft 52. Rotating shaft 52 pivots freely about the axis formed by shaft screw 56 and rotating shaft rides on and is supported by radial bearing 54 and thrust bearing 55.

Housing screws 60 extend through lower housing section 18B and upper housing section 18A and are threaded onto threads 62 of handheld leash attachment clip 40.

Figure 6:
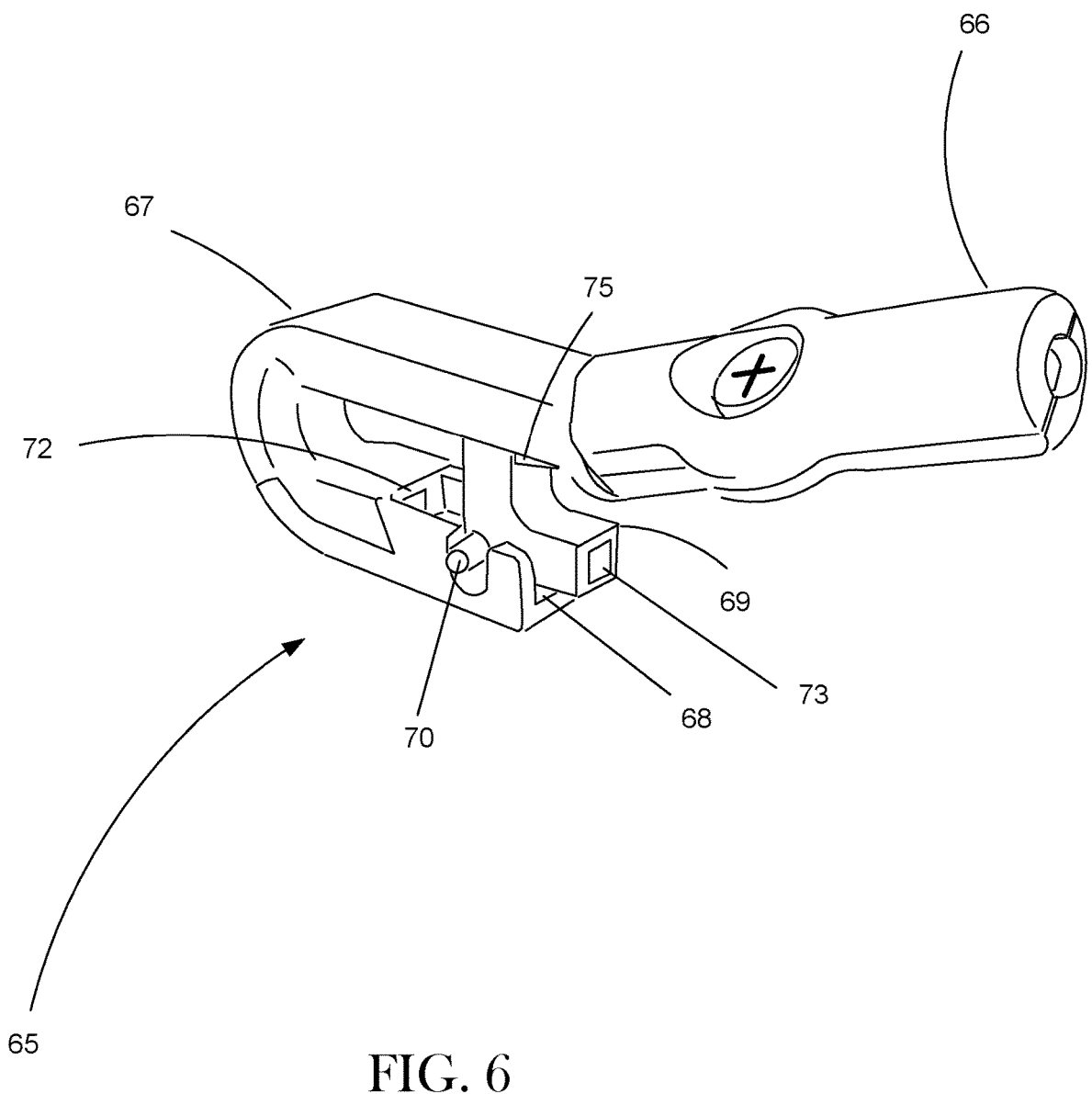
FIG. 6 shows a perspective view of a preferred magnetic-locking attachment clip.
Figure 7:
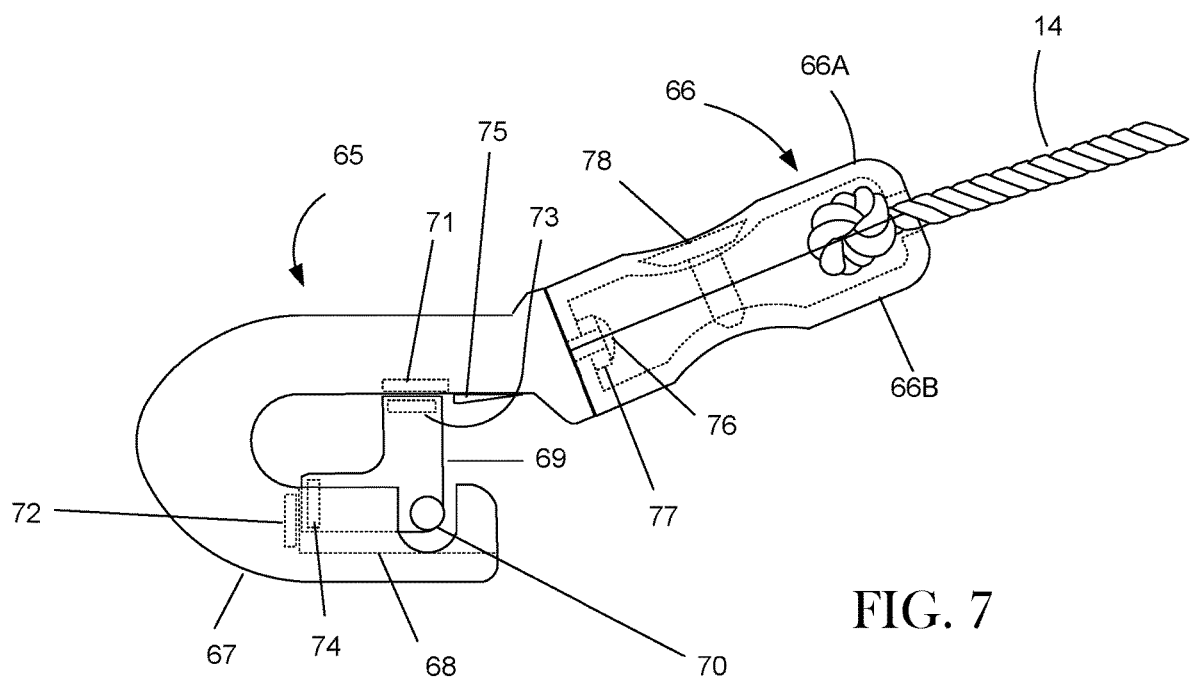
FIG. 7 shows a side view of a preferred magnetic-locking attachment clip.

FIG. 6 shows a perspective view and FIG. 7 shows a side view of magnetic-locking attachment clip 65. Attachment clip 65 includes cord cover section 66 for connection to cord 14 (see also FIG. 1). Clip section 67 is pivotally connected to cord cover section 66. Clip section 67 further includes magnets 71 and 72 arranged as shown. Clip section 67 also includes cutout section 68 that allows for the pivotal connection of L-shaped rocker 69. L-shaped rocker 69 includes pivot axis 70. Magnets 73 and 74 are attached to L-shaped rocker 69 and interact with magnets 71 and 72 of clip section 67. Ramp 75 prevents unwanted rotation of L-shaped rocker 69.

Pivot screw 76 is threaded into clip section 67. Cord cover section 66 pivots about the axis formed by pivot screw 76. Rubber washer 77 provides support for cord cover section 66. Upper cover 66A and lower cover 66B are joined together tightly by utilization of connection screw 78.

FIGS. 8-15 depict the utilization of magnetic-locking attachment clip 65.

Figure 8:
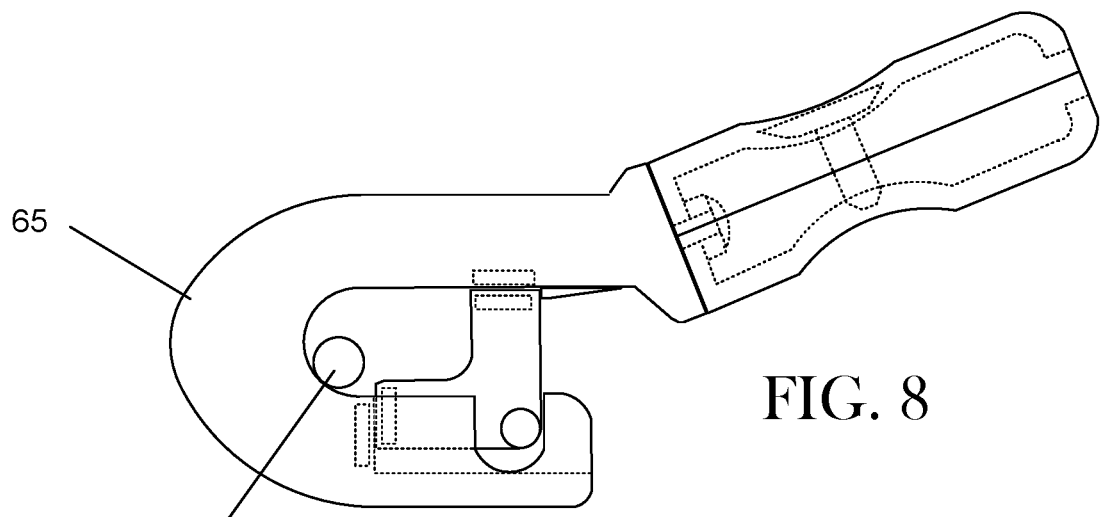
FIGS. 8-15 show the utilization of the magnetic-locking attachment clip.

FIG. 8 shows clip 65 connected to a dog's collar ring 80 (see also FIG. 1).

Figure 9:
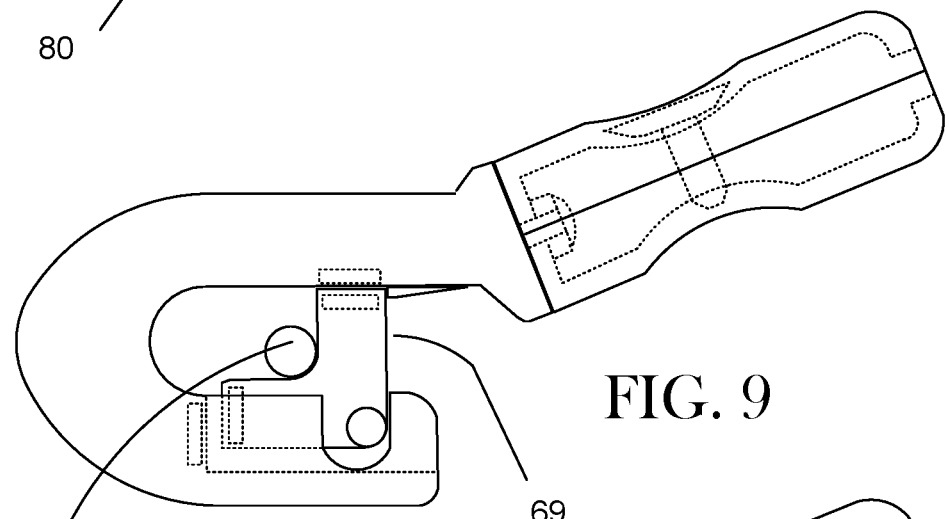

In FIG. 9, the user has decided that he wants to remove clip 65 from collar ring 80 and has moved collar ring 80 towards L-shaped rocker 69.

Figure 10:
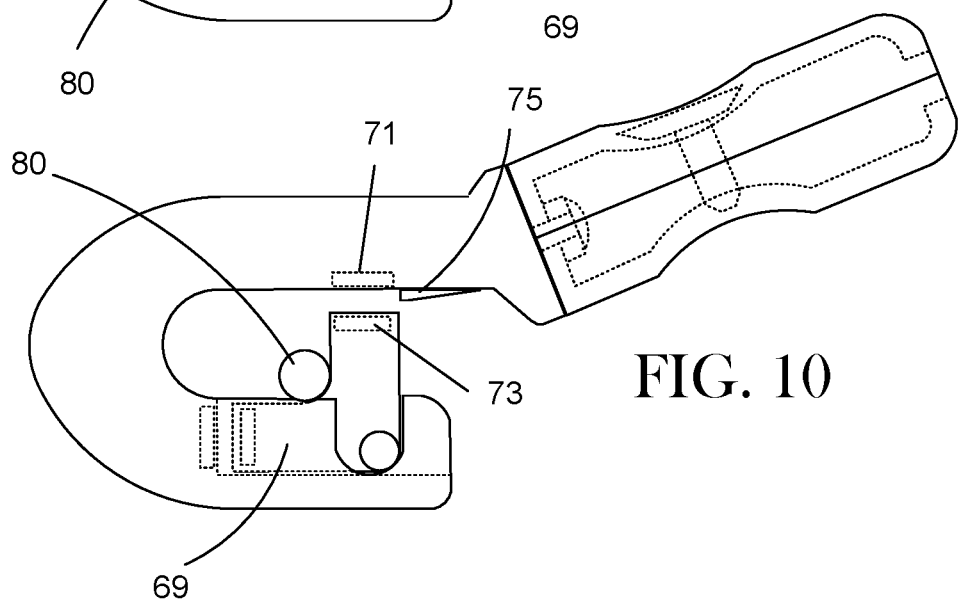

In FIG. 10 the user has used ring 80 to push down on L-shaped rocker 69 to overcome the magnetic attraction force between magnets 71 and 73 and to also clear ramp 75.

Figure 11:
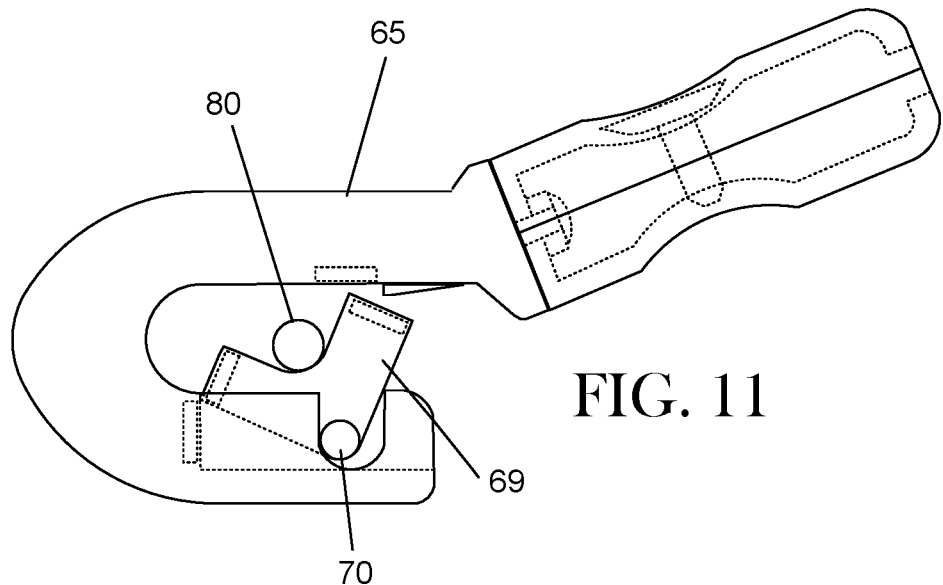

In FIG. 11 the user is continuing to pull ring 80 away from clip 65. L-shaped rocker 69 is rotating about pivot axis 70.

Figure 12:
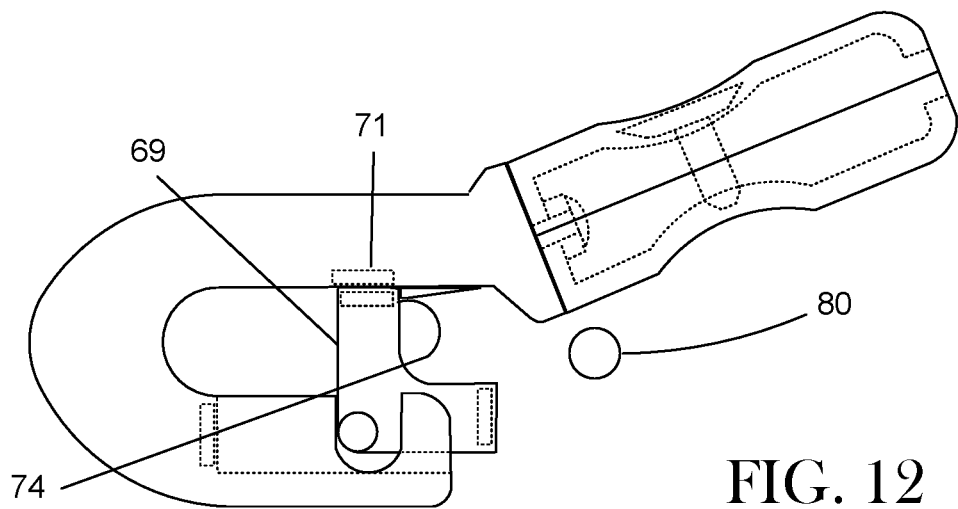

In FIG. 12 the user has removed ring 80 from clip 65. L-shaped rocker has rotated to the position shown and is held steady in place by the magnetic attraction between magnets 74 and 71.

Figure 13:
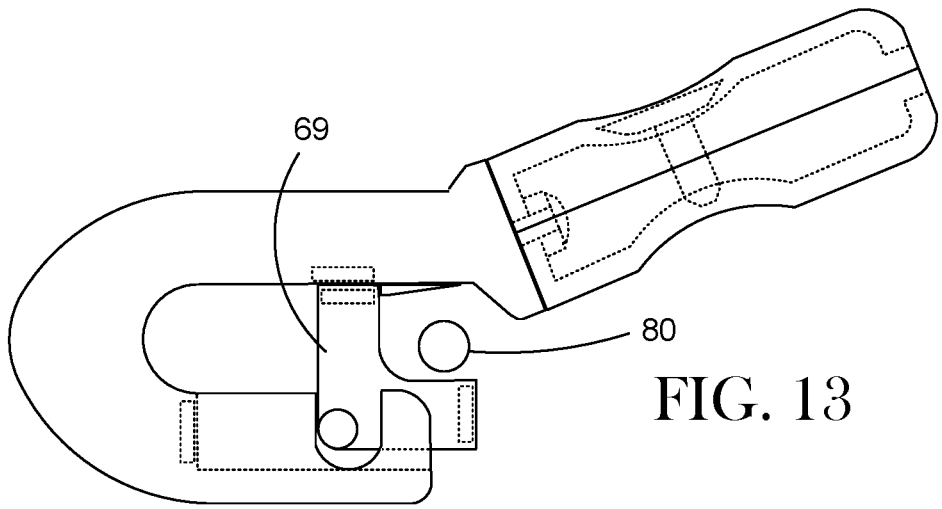

In FIG. 13 the user has decided to reattach clip 65 to ring 80 and has moved ring 80 towards L-shaped rocker 69.

Figure 14:
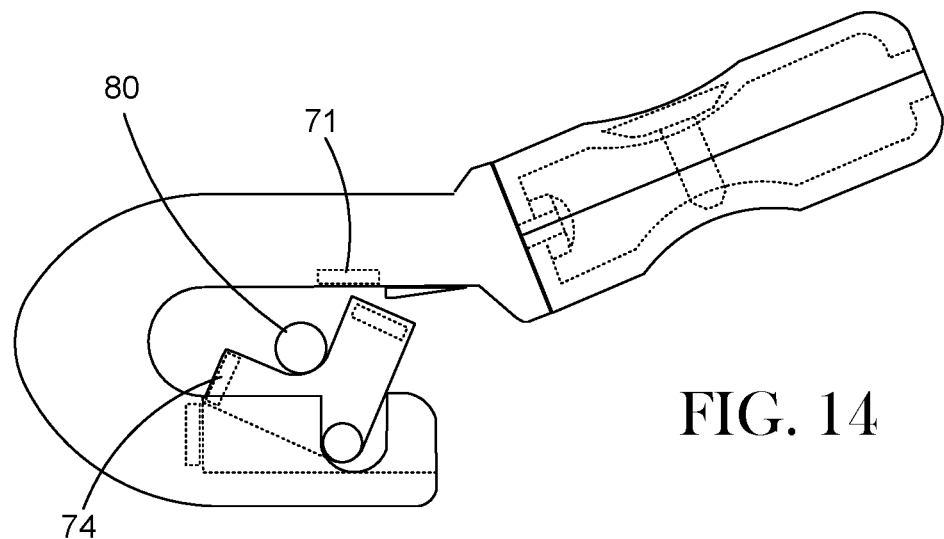

In FIG. 14 the user has pushed ring 80 further into clip 65 and has overcome the magnetic attraction force between magnets 71 and 74.

Figure 15:
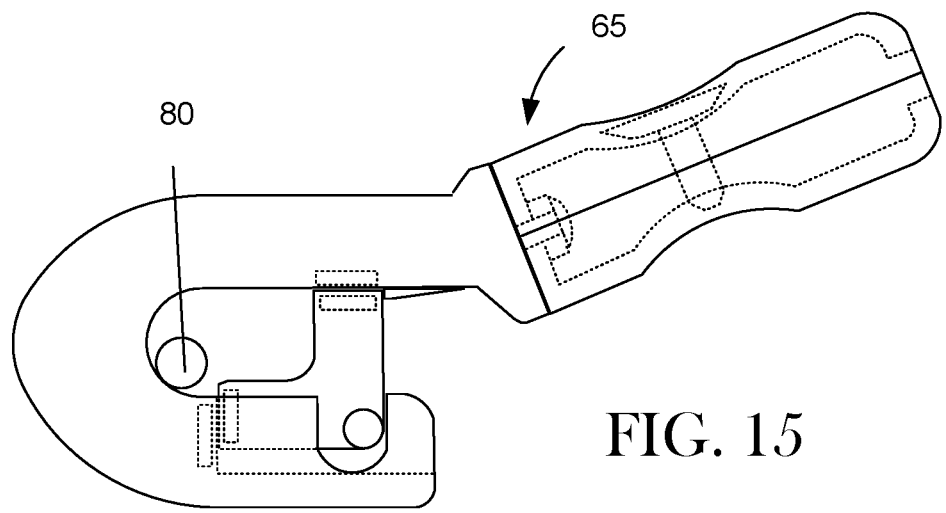

In FIG. 15 the user has completed connecting clip 65 to ring 80 so that clip 65 is in the position shown earlier in FIGS. 8 and 1.

While the present invention has been described in terms of preferred embodiments, the reader should consider these described embodiments only as particular embodiments. Many other embodiments are possible. Therefore, the reader should determine the scope of the present invention by the claims and their legal equivalents.

What is claimed is:

1. A dog leash splitting device to allow for the walking of two dogs simultaneously, said splitting device comprising:
   A. a housing section,
   C. a rotating shaft rotatably connected to said housing section,
   D. a cord access hole extending through said rotating shaft,
   E. a dog connection cord extending through said cord access hole, and
   F. a cord tightening screw extending through said rotating shaft and into said cord access hold,
   wherein said dog connection cord is free to slide through said cord access hole when said tightening screw is loose and wherein said dog connection cord is stopped from sliding through said cord access hole when said cord tightening screw is tightened onto said dog connection cord.

2. The dog leash splitting device as in claim 1, further comprising a handheld leash attachment clip connected to said housing section.

3. The dog leash splitting device as in claim 1, further comprising:
   A. a radial bearing, and
   B. a thrust bearing, wherein said rotating shaft extends through said thrust bearing and said radial bearing and rides on said thrust bearing and said radial bearing.

4. The dog leash splitting device as in claim 1, further comprising two magnetic-locking attachment clips, each attachment clip connected to either end of said dog connection cord.

5. The dog leash splitting device as in claim 4, wherein each said magnetic-locking attachment clip comprises:
   A. a cord cover section, and
   B. a clip section rotatably connected to said cord cover section.

6. The dog leash splitting device as in claim 5, wherein said clip section comprises:
   A. an L-shaped rocker pivotally connected to said clip section, said L-shaped rocker comprising a pivot axle and at least one rocker magnet,
   B. at least one clip magnet connected to said clip section,
   C. wherein a dog collar ring is attached and removed from said clip section by pressing against said L-shaped rocker to overcome magnetic attraction force between said at least one clip magnet and said at least one rocker magnet.

7. The dog leash splitting device as in claim 6, further comprising a ramp rigidly connected to said clip section, said ramp preventing unwanted rotational motion of said L-shaped rocker.

* * * * *